United States Patent
Kim et al.

(10) Patent No.: US 11,546,163 B2
(45) Date of Patent: Jan. 3, 2023

(54) SYSTEM FOR PERFORMING SERVICE BY USING BIOMETRIC INFORMATION, AND CONTROL METHOD THEREFOR

(71) Applicant: SAMSUNG ELECTRONICS CO., LTD., Gyeonggi-do (KR)

(72) Inventors: Jinsu Kim, Gyeonggi-do (KR); Junbum Shin, Gyeonggi-do (KR); Sungwook Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 94 days.

(21) Appl. No.: 17/058,572

(22) PCT Filed: May 13, 2019

(86) PCT No.: PCT/KR2019/005729
§ 371 (c)(1),
(2) Date: Nov. 24, 2020

(87) PCT Pub. No.: WO2019/231140
PCT Pub. Date: Dec. 5, 2019

(65) Prior Publication Data
US 2021/0211292 A1    Jul. 8, 2021

(30) Foreign Application Priority Data

May 31, 2018  (KR) .................. 10-2018-0062943
Jan. 22, 2019  (KR) .................. 10-2019-0008005

(51) Int. Cl.
*G06F 21/00*  (2013.01)
*H04L 9/32*  (2006.01)
(Continued)

(52) U.S. Cl.
CPC .......... *H04L 9/3231* (2013.01); *H04L 9/0819* (2013.01); *H04L 9/14* (2013.01); *H04L 9/3242* (2013.01); *H04L 9/3247* (2013.01)

(58) Field of Classification Search
CPC ....... H04L 9/3231; H04L 9/0819; H04L 9/14; H04L 9/3242; H04L 9/3247
See application file for complete search history.

(56) References Cited

U.S. PATENT DOCUMENTS 9,031,231 B2    5/2015  Asim et al.
10,764,035 B2   9/2020  Ahn et al.
(Continued)

FOREIGN PATENT DOCUMENTS

EP    3 038 286    6/2016
EP    3288214      2/2018
(Continued)

OTHER PUBLICATIONS

Indian Examination Report dated Dec. 20, 2021 issued in counterpart application No. 202017054320, 5 pages.
(Continued)

*Primary Examiner* — Darshan I Dhruv
(74) *Attorney, Agent, or Firm* — The Farrell Law Firm, P.C.

(57) ABSTRACT

A system for performing a service by using biometric information is disclosed. A system according to the present disclosure comprises an electronic device, a first server and a second server, and a control method of the system comprises the steps of: allowing the electronic device to acquire first biometric information; allowing the electronic device to acquire first encrypted data, in which the first biometric information is encrypted, by using the acquired first biometric information and a first encryption key, and to transmit same to the first server, allowing the first server to acquire second encrypted data, in which the first encrypted data is encrypted, by using the first encrypted data received from the electronic device and a second encrypted key, and first user identification information corresponding to the first biometric information, and to transmit same to the second
(Continued)

server; allowing the second server to match the second encrypted data and the first user identification information corresponding to the biometric information, which are received from the first server, and to store same; allowing the second server to acquire authentication information on the basis of the matched second encrypted data and first user identification information, and to transmit same to the first server, and allowing the first server to register the authentication information on the biometric information.

14 Claims, 13 Drawing Sheets

(51) Int. Cl.
*H04L 9/08* (2006.01)
*H04L 9/14* (2006.01)

(56) References Cited

U.S. PATENT DOCUMENTS

| | | | | |
|---|---|---|---|---|
| 2010/0071041 | A1* | 3/2010 | Ikegami | G06F 21/32 726/6 |
| 2015/0207630 | A1* | 7/2015 | Shimoyama | G06Q 20/40145 713/186 |
| 2016/0182226 | A1* | 6/2016 | Yasuda | H04L 9/0869 380/28 |
| 2016/0241405 | A1 | 8/2016 | Jeong et al. | |
| 2017/0017826 | A1 | 1/2017 | Slaby et al. | |
| 2017/0017963 | A1* | 1/2017 | Cho | G06Q 20/3227 |
| 2017/0104752 | A1* | 4/2017 | Sakemi | H04L 9/0618 |
| 2019/0349362 | A1* | 11/2019 | Cheon | H04L 63/0861 |

FOREIGN PATENT DOCUMENTS

| | | | |
|---|---|---|---|
| JP | 2014219711 | 11/2014 | |
| JP | 5701855 | 4/2015 | |
| KR | 1020150115593 | 10/2015 | |
| KR | 20160099922 | 8/2016 | |
| KR | 20160137948 | 12/2016 | |
| KR | 20170039642 | 4/2017 | |
| KR | 101768213 | 8/2017 | |
| KR | 20170095029 | 8/2017 | |
| WO | WO-2012153030 A1 * | 11/2012 | ........... H04L 9/0894 |
| WO | WO-2018058544 A1 * | 9/2016 | |

OTHER PUBLICATIONS

European Search Report dated May 7, 2021 issued in counterpart application No. 19811938.0-1218, 7 pages.
PCT/ISA/210 Search Report issued on PCT/KR2019/005729, dated Aug. 27, 2019, pp. 5.
PCT/ISA/237 Written Opinion issued on PCT/KR2019/005729, dated Aug. 27, 2019, pp. 11.
Kang Sin-woo, "Payment is made just by placing palm, Hand Pay Era in Convenience Store", May 16, 2017, pp. 6, http://www.edaily.co.kr/news/NewsRead.edy?SCD=JC21&newsid=04132806615929576&DCD=A00302.
Hyojeong, You, "Unmanned Store Equipped with Facial Recognition Technology for Entrance and Payment", Aug. 31, 2017, pp. 5, http://www.zdnet.co.kr/news/news_view.asp?artice_id=20170831162017.
Giho, Kang, "Block Rental Car Car Sharing from Unqualified Drivers", Sep. 21, 2017, pp. 4, http://m.autoherald.co.kr/news/articleView.html?idxno=23422.
Cheol, Ok, "Walmart Launches In-Home Delivery Service", Sep. 24, 2017, pp. 5, http://www.yonhapnews.co.kr/bulletin/2017/09/24/0200000000AKR20170924002100075.HTML.
Anonymous submission to ASIACCS 2018, Jun. 2018, Songdo, Incheon, Korea, "Enhancing Privacy Protection in Outsourced Biometric Authentication", pp. 15.

* cited by examiner

300

400

SYSTEM FOR PERFORMING SERVICE BY USING BIOMETRIC INFORMATION, AND CONTROL METHOD THEREFOR

PRIORITY

This application is a National Phase Entry of International Application No. PCT/KR2019/005729, which was filed on May 13, 2019, and claims priority to Korean Patent Application Nos. 10-2018-0062943 and 10-2019-0008005, which were filed in the Korean Intellectual Property Office on May 31, 2018 and Jan. 22, 2019, respectively, the content of each of which is incorporated herein by reference.

TECHNICAL FIELD

This disclosure relates to a system for performing a service using biometric information and a controlling method therefore and, more particularly, to a system for performing a service using only biometric information of a user while protecting biometric information of a user.

BACKGROUND ART

Recently, technologies for providing various services using user information while protecting user information have been studied. For example, a payment system using user information, a rental system using user information, or the like, are provided.

For example, in the related art, in order to use offline payment for using a service, a user has to pay a cost using cash or pay a fee using a credit card. Therefore, if a user does not hold a cash or a credit card, there is a problem that offline payment cannot be performed for using a service.

Technologies for providing various services using biometric information of a user are being studied. However, in that user's biometric information is unique information of a user and thus there is a feature that it is impossible to change the biometric information. When biometric information of a user is stolen by an external attack, the user's unchangeable information may be exposed to other persons, and there is a need for a method to protect biometric information.

DISCLOSURE

Technical Problem

The disclosure has been made to solve the above-described problems, and an object of the disclosure is to provide a system for protecting biometric information of a user and providing various services by inputting only biometric information, and a controlling method thereof.

Technical Solution

A method for controlling a system including an electronic device, a first server, and a second server includes obtaining, by the electronic device, first biometric information, obtaining, by the electronic device, first encrypted data, in which the first biometric information is encrypted, by using the obtained first biometric information and a first encryption key, and transmitting same to the first server, obtaining, by the first server, second encrypted data, in which the first encrypted data is encrypted, by using the first encrypted data received from the electronic device and a second encryption key, and first user identification information corresponding to the first biometric information, and transmitting same to the second server, matching, by the second server, the second encrypted data received from the first server and first user identification information corresponding to the biometric information and storing same, obtaining, by the second server, authentication information based on the matched second encrypted data and the first user identification information and transmitting same to the first server, and registering, by the first server, the authentication information about the biometric information.

The system may further include a third server providing a service, and the method may further include, based on receiving, by the first server, a biometric information registration command for using a service of the third server, transmitting, by the first server, the authentication information and the biometric information issuance request information to the third server, checking, by the third server, validity of the received authentication information, based on the received authentication information being valid, transmitting, by the third server, the authentication information and the biometric information issuance request information to the second server, transmitting, by the second server, the second encrypted data corresponding to the authentication information and the first user identification information to the third server, and registering, by the third server, the second encrypted data received from the second server and the first user identification information.

The method may further include obtaining, by the electronic device, second biometric information, based on a command for inputting biometric information for performing a service being input, obtaining, by the electronic device, third encrypted data, in which the first biometric information is encrypted, by using the obtained second biometric information and a first encryption key, and transmitting same to the first server, obtaining, by the first server, fourth encrypted data, in which the third encrypted data is encrypted, by using the third encrypted data received from the electronic device and a second encryption key and transmitting same to the third server, identifying, by the third server, whether encrypted data corresponding to the received fourth encrypted data is present in the third server, and based on the encrypted data corresponding to the fourth encrypted data being present in the third server, performing, by the third server, a service corresponding to a command for inputting biometric information to perform the service.

According to another embodiment, a system including an electronic device, a first server, and a second server includes an electronic device configured to obtain first biometric information and obtain first encrypted data, in which the first biometric information is encrypted, by using the obtained first biometric information and a first encryption key includes a first server configured to receive the first encrypted data from the electronic device and obtain second encrypted data, in which the first encrypted data is encrypted, by using the first encrypted data and a second encryption key and first user identification information corresponding to the first biometric information, and a second server configured to receive the second encrypted data from the first server, obtain authentication information based on the second encrypted data, and transmit the authentication information to the first server, wherein the first server may register the authentication information received from the second server as the authentication information with respect to the biometric information.

The system may further include a third server providing a service, the first server is configured to receive a biometric information registration command for using a service of the third server and transmit the authentication information and the biometric information issuance request information to the third server, the third server is configured to check validity of the received authentication information, and based on the received authentication information being valid, transmit the authentication information and the biometric information issuance request information to the second server, the second server is configured to transmit the second encrypted data corresponding to the authentication information received from the third server and the first user identification information to the third server, and the third server is configured to register the second encrypted data received from the second server and the first user identification information.

The electronic device is configured to obtain, by the electronic device, second biometric information, based on a command for inputting biometric information for performing a service being input, obtain third encrypted data, in which the first biometric information is encrypted, by using the obtained second biometric information and a first encryption key, and transmit same to the first server, the first server is configured to obtain fourth encrypted data, in which the third encrypted data is encrypted, by using the third encrypted data received from the electronic device and a second encryption key and transmit same to the third server, the third server is configured to identify whether encrypted data corresponding to the received fourth encrypted data is present in the third server, and based on the encrypted data corresponding to the fourth encrypted data being present in the third server, perform a service corresponding to a command for inputting biometric information to perform the service.

A controlling method of a third server according to an embodiment includes, based on a user command to register biometric information for using a service being input, receiving, from a first server, authentication information and biometric information issuance request information, based on the received authentication information being valid, transmitting the authentication information and the biometric information issuance request information to a second server, and receiving, from the second server, second encrypted data which is encrypted in the first server and first user identification information corresponding to the second encrypted data and storing same.

The controlling method may further include, based on a biometric information registration command being input, receiving fourth encrypted data in which biometric information is encrypted from the first server, identifying whether the encrypted data corresponding to the fourth encrypted data is present in the third server, and based on the encrypted data corresponding to the fourth encrypted data being present in the third server, performing the service.

A third server according to still another embodiment includes a memory, a communicator, and a processor to, based on a user command to register biometric information using a service being input, receive authentication information and biometric information issuance request information from the first server through the communicator, and identify whether the received authentication information is valid, the processor, based on the authentication information being valid, transmit the authentication information and the biometric information issuance request information to a second server through the communicator, receive, from the second server, second encrypted data encrypted in the first server and the first user identification information corresponding to the second encrypted data through the communicator and store same in a memory.

The processor may, based on a biometric information registration command to perform a service being input, receive fourth encrypted data in which biometric information is encrypted from the first server through the communicator, identify whether encrypted data corresponding to the fourth encrypted data is present in the memory, and based on the encrypted data corresponding to the fourth encrypted data being present in the memory, perform the service.

Effect of Invention

According to various embodiments, the system may provide various services by merely inputting biometric information, while protecting biometric information safely.

BEST MODE FOR CARRYING OUT THE INVENTION

Figure 1:
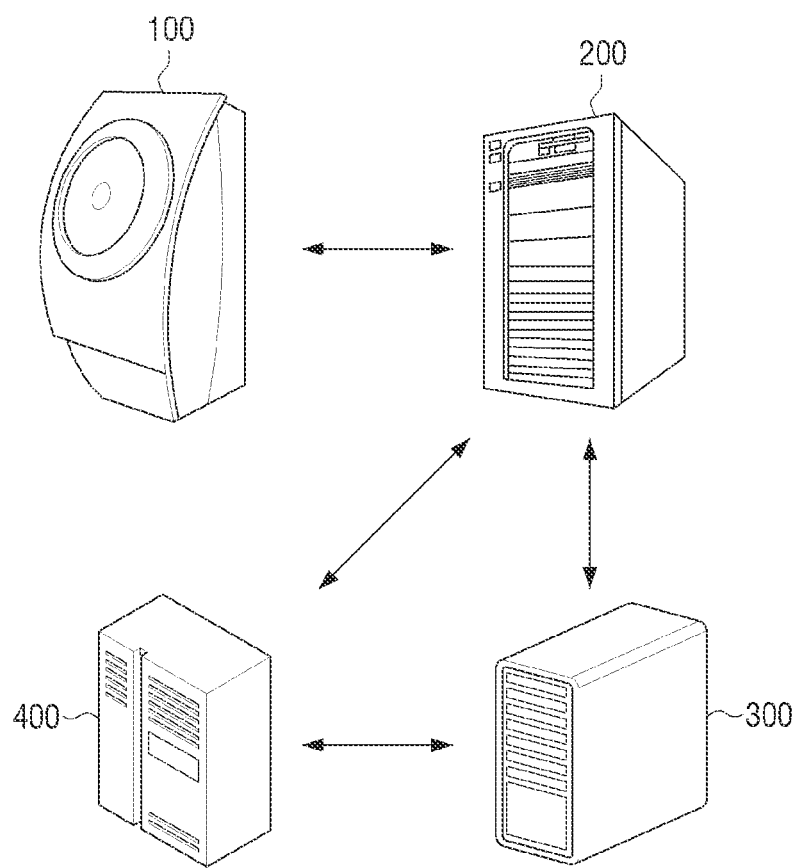
FIG. 1 is a system diagram illustrating an authentication system according to an embodiment.

Before specifically describing the disclosure, a method for demonstrating the present specification and drawings will be described.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed description of related known technologies may unnecessarily confuse the gist of the disclosure, the detailed description will be omitted.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Hereinafter, with reference to the attached drawings, embodiments will be described in detail so that those skilled in the art to which the disclosure belongs to can easily make and use the embodiments. The disclosure may, however, be embodied in many different forms and should not be construed as limited to the embodiments set forth herein. In the drawings, the parts not related to the description is omitted for clarity of the description and like reference numerals designate like elements throughout the specification.

The embodiment according to the disclosure mainly describes an embodiment of encrypting biometric information of a user, but the embodiment is not limited thereto. That is, the technical idea of the disclosure can be applied to various user information such as biometric information of a user as well as other identification information (resident registration number, identification (ID), or the like), password, pattern, or the like. The encryption according to the disclosure can be applied to a variety of encryption methods.

FIG. 1 is a system diagram illustrating an authentication system according to an embodiment.

As illustrated in FIG. 1, a system 1000 includes an electronic device 100, a first server 200, a second server 300, and a third sever 400.

The electronic device 100 is a device for obtaining biometric information of a user. For example, the electronic device 100 may be a device for fingerprint recognition, a device for iris recognition, a device for palm vein recognition, a device for face recognition, or the like. Further, the electronic device 100 may be a variety of devices capable of generating or obtaining various information, as well as the biometric information of the user.

The electronic device 100 can obtain first biometric information of the user and generate first encrypted data using the obtained first biometric information and a first encryption key. In the same manner, the electronic device 100 can obtain the second biometric information of the user and generate third encrypted data using the obtained second biometric information and the first encryption key. That is, the first encrypted data and the third encrypted data may be data encrypted using the same first encryption key. The first encrypted data may be encrypted data necessary for registering the encrypted data for the biometric information of the user to a second server 300 and a third server 400, and the third encrypted data may be encrypted data for the second biometric information input by the user when desiring to use a service provided by the third server 400.

According to various embodiments, the electronic device 100 may transmit a message authentication code (MAC) for verifying validity of the third encrypted data along with the third encrypted data to the first server 200.

The first server 200 is a device for receiving data for encryption from the electronic device 100, and communicating with the second server 300 and the third server 400 to register biometric information. The first server 200 may be a variety of types of servers or electronic devices. For example, the first server 200 may be a user terminal device. Alternatively, the first server 200 may be a server that is authorized to access the user. For example, the first server 200 may be a personal cloud server that is authorized to access the user, or the like. Alternatively, the first server 200 may be a separate server accessible by the same manager as the manager of the third server 400. Alternatively, the first server 200 may be a server that is managed independently of the electronic device 100, the second server 300, and the third server 400. The first server 200 may be a variety of servers that are independent of the electronic device 100, the second server 300, and the third server 400.

The first server 200 can generate the second encrypted data using the first encrypted data received from the electronic device 100 and a second encryption key. The first server 200 can obtain the first user identification information together. The first user identification information may be information for identification of the user with respect to the second encrypted data and may be received from, for example, a user terminal device.

In the same manner, the first server 200 can generate fourth encrypted data using the third encrypted data and the second encryption key, and can obtain second user identification information corresponding to the fourth encrypted data. The first server 200 may transmit the second encrypted data and the first user identification information to the second server 300 or may transmit at least one of the fourth encrypted data and the second user identification information to the second server 300. When the first server 200 receives the message authentication code from the electronic device 100, the first server 200 can transmit the fourth encrypted data, the second user identification information, and the message authentication code to the third server 400.

The second server 300 is a device for authenticating the encrypted biometric information necessary for the third server 400 to provide a service. The second server 300 can be a server for authenticating the reliability of the encrypted biometric information, and may be a server managed by a national institution, or various authentication authorities.

The second server 300 may receive the second encrypted data and the first user identification information from the first server 200, and may identify whether the received second encrypted data is encrypted data corresponding to the first user identification information. If the received second encrypted data is encrypted data corresponding to the first user identification information, the second server 300 can generate authentication information for authenticating the second encrypted data and the first user identification information and may transmit the same to the first server 200. In this example, the generated authentication information may include a signature value of the second server 300.

When a control signal requesting encrypted data for using a service is received from the third server 400, the second server 300 may transmit, to the third server 400, the encrypted data, or transmit the encrypted data and user identification information corresponding to the encrypted data to the third server 400. Specifically, upon receiving the authentication information from the third server 400, the second server 300 can transmit the second encrypted data and the first user identification information corresponding to the received authentication information to the third server 400. In this example, as described below, the authentication information transmitted from the second server 300 to the third server 400 may be authentication information received from the first server 200.

The third server 400 is configured to register encrypted biometric information and user identification information for using a service. When the third server 400 receives the encrypted biometric information for use of the service, the third server 400 may provide the service. That is, the third server 400 may be a server managed by a service provider for providing a service.

The third server 400 may receive authentication information and biometric information issuance request information from the first server 200. If the received authentication information is valid, the third server 400 may transmit the authentication information and the biometric information issuance request information to the second server 300. The third server 400 may receive encrypted data and user identification information corresponding to the authentication information transmitted from the second server 300. Specifically, the third server 400 may receive and store the second encrypted data and the user identification information from the second server 300.

Upon receiving the encrypted data and service information for using a service from the first server 200, the third server 400 may identify the validity of the received encrypted data. If the received encrypted data is valid, the third server 400 may perform a service corresponding to the service information. The service information may be related to a type of service to be provided by the third server 400 and may be, for example, a service for paying a specific amount of money, a service for identifying user information, or the like.

For example, when the fourth encrypted data and the service information are received from the first server 200, the third server 400 can identify whether encrypted data (e.g., second encrypted data) corresponding to the fourth encrypted data is present. If the encrypted data corresponding to the fourth encrypted data is present, the third server 400 may perform a service corresponding to the service information.

In another embodiment, the third server 400 may receive encrypted data, user identification information and service information corresponding to the encrypted data from the first server 200. For example, the third server 400 may receive the fourth encrypted data, the second user identification information corresponding to the fourth encrypted data, and the service information from the first server 200. In this example, the third server 400 may obtain user identification information (e.g., first user identification information) corresponding to the second user identification information, and may identify whether encrypted data (e.g., second encrypted data) corresponding to the obtained user identification information is encrypted data corresponding to the fourth encrypted data. If the encrypted data corresponding to the obtained user identification information (e.g., the second encrypted data) is encrypted data corresponding to the fourth encrypted data, the third server 400 may perform a service corresponding to the service information.

In this example, the third server 400 may not decrypt the second encrypted data and the fourth encrypted data, and may identify whether the first biometric information corresponding to the second encrypted data and the second biometric information corresponding to the fourth encrypted data are the same user's biometric information.

Meanwhile, each of the electronic device 100, the first server 200, the second server 300, and the third server 400 may be implemented as an independent single server, but is not limited thereto. For example, at least two of the electronic device 100, the first server 200, the second server 300, and the third server 400 may be implemented as one server as needed. As another example, each of the electronic device 100, the first server 200, the second server 300, and the third server 400 may include a cloud server or a plurality of distributed servers.

Figure 2:
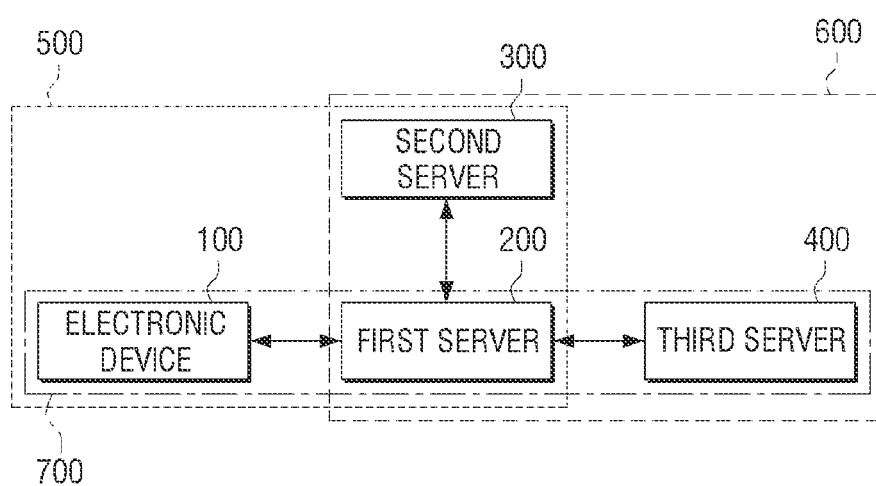
FIG. 2 is a system diagram briefly illustrating an operation of a system according to an embodiment.

FIG. 2 is a system diagram briefly illustrating an operation of a system according to an embodiment.

The system 1000 including the electronic device 100, the first server 200, the second server 300, and the third server 400 can provide a service through 1) a biometric information registration process 500, 2) a biometric information registration process 600 for using a service, and 3) a user authentication process 700 for providing a service. The biometric information registration process 500 may be performed by the electronic device 100, the first server 200, and the second server 300, and the biometric information registration process 600 for using a service may be performed by the first server 200, the second server 300, and the third server 400, and the user authentication process 700 for providing the service can be performed by the electronic device 100, the first server 200, and the third server 400.

Hereinafter, operations of 1) the biometric information registration process 500, 2) the biometric information registration process 600 for using a service and 3) the user authentication process 700 for providing the service will be described in detail with reference to FIGS. 2 and 5 to 7.

In the biometric information registration process 500, the electronic device 100 may obtain the first biometric information and may obtain the first encrypted data in which the first biometric information is encrypted using the obtained first biometric information and the first encryption key.

The first server 200 may receive the first encrypted data from the electronic device 100, and may obtain the second encrypted data in which the first encrypted data is encrypted using the first encrypted data and second encryption key, and first user identification information corresponding to the first biometric information.

The second server 300 may receive the second encrypted data from the first server 200, obtain authentication information based on the second encrypted data, and transmit the obtained authentication information to the first server 200. In this example, the authentication information may include a signature value of the second server 300.

The first server 200 can register the authentication information received from the second server as the authentication information for the biometric information. The first server 200 can register the authentication information received from the second server as the authentication information associated with the first biometric information corresponding to the first encrypted data or the first biometric information corresponding to the second encrypted data.

The first user identification information may be obtained by the first server 200. For example, the first user identification information may be obtained through a method of directly registering by the user to the first server 200.

Figure 5:
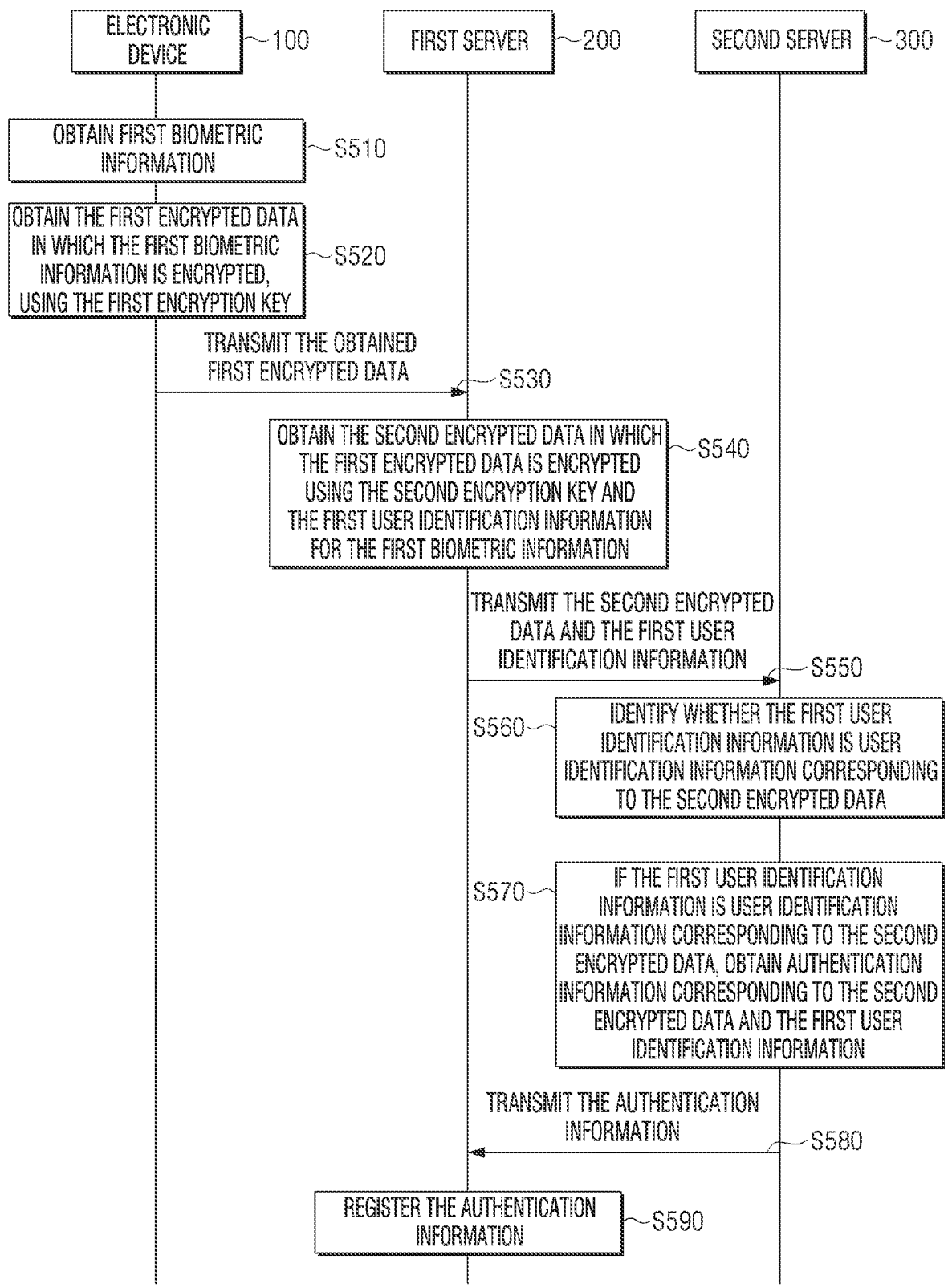
FIG. 5 is a sequence diagram illustrating a biometric information registration process according to an embodiment.

As illustrated in FIG. 5, the biometric information registration process 500 may operate in which the electronic device 100, the first server 200, and the second server 300 are in association with each other.

The electronic device 100 can obtain first biometric information in operation S510. Specifically, when the electronic device 100 receives a control signal for receiving the user's biometric information, the electronic device 100 may request the user to input the user's biometric information. For example, if the electronic device 100 includes a display, the electronic device 100 may display a guide screen that guides biometric information input. As another example, if the electronic device 100 includes a speaker, the electronic device 100 may output an audio signal requesting input of the biometric information.

A control signal that inputs biometric information may be received from various devices. For example, a control signal for inputting biometric information may be received from the first server 200 or the second server 300. In this example, the control signal may further include information on a device to transmit the encrypted data in which the biometric information is encrypted. As another example, the biometric information input signal may be generated within the electronic device 100. In this example, the electronic device 100 may receive information on the device to transmit the encrypted data in which the biometric information is encrypted.

The electronic device 100 can obtain the first encrypted data in which the first biometric information is encrypted, using the first encryption key in operation S520. At this time, the first encrypted data may be encrypted by a public key encryption method such as, for example, an ElGamal encryption scheme, a Diffie-Hellman encryption scheme, an elliptic curve encryption scheme, or the like. The encryption scheme using the first encryption key is characterized in that the first encryption key can be regarded as a plaintext in encryption using the second encryption key in the encryption scheme using the second encryption key, which will be described later.

The first encryption key can be regarded as a plain text in an encryption method using a second encryption key, and the first encrypted data can be generated by various encryption methods in which the first encryption key can be regarded as a plaintext in an encryption method using a second encryption key, as well as the encryption method above. As described below, the first encrypted data may be encrypted by a public key encryption method such as an ElGamal encryption scheme, a Diffie-Hellman encryption method, an elliptic curve encryption scheme, or the like, so as to identify that the first biometric information and the second biometric information are the biometric information for the same user in the user authentication process 700 for providing a service.

The electronic device 100 may transmit the obtained first encrypted data to the first server 200 in operation S530.

The first server 200 can obtain the second encrypted data in which the first encrypted data is encrypted using the second encryption key and the first user identification information for the first biometric information in operation S540. In this example, the second encrypted data may be encrypted data by, for example, an inner product encryption (IPE). The encryption method by the IPE has a feature of checking the identity of the input biometric information without decrypting the encrypted data. In addition to the encryption method by the IPE described above, various encryption methods having homomorphic properties capable of performing operation in a state in which data is encrypted can be used to generate the second encrypted data. Meanwhile, the first server 200 may receive first user identification information for the first encrypted data. For example, the first server 200 may receive the first user identification information directly from the user. As another example, the first server 200 may obtain first user identification information based on biometric information pre-registered by an external authentication authority and user identification information matched with pre-registered biometric information. At this time, if the first server 200 is a server having an access right to a user terminal device or a user, the first server 200 may store only one user identification information and store at least one encrypted data corresponding to the stored user identification information. However, if the first server 200 is a server that is not authorized to access the user, the first server 200 may match and store at least one encrypted data for each of the at least one user identification information.

The first server 200 may transmit the second encrypted data and the first user identification information to the second server 300 in operation S550.

The second server 300 can identify whether the first user identification information is user identification information corresponding to the second encrypted data in operation S560. In one embodiment, the second server 300 may transmit, to a user terminal device corresponding to the first user identification information, a request to confirm whether the first user identification information is user identification information corresponding to the second encrypted data. For example, the second server 300 may transmit, to a user terminal device, a text message inquiring whether the first user identification information is user identification information corresponding to the second encrypted data, and if the authentication number input from the user and the authentication number transmitted by the second server 300 are the same, the second server 300 can identify that the first user identification information is user identification information corresponding to the second encrypted data. In another embodiment, whether the second encrypted data corresponds to the first user identification information may be identified by a face-to-face method.

If the first user identification information is user identification information corresponding to the second encrypted data, the second server 300 can obtain authentication information corresponding to the second encrypted data and the first user identification information in operation S570. At this time, the obtained authentication information may include unique signature value information of the second server 300.

The second server 300 may transmit the obtained authentication information to the first server 200 in operation S580. The first server 200 may register the obtained authentication information in operation S590.

Through the above-described process, the system 1000 may encrypt the biometric information of the user, match the encrypted user biometric information with the user identification information, obtain, from the second server 300, authentication information that the encrypted biometric information and the user identification information are legitimate information for using a service, and store the authentication information in the first server 200.

In the biometric information registration process 600 for using a service, the first server 200 can receive a user command for registering biometric information for using a service of the third server 400. At this time, the user command for registering the biometric information for using a service can be received from the third server 400 or other external devices. The first server 200 may transmit the authentication information and the biometric information issuance request information registered in the biometric information registration process 500 to the third server 400.

The third server 400 can identify the validity of the received authentication information. Specifically, the third server 400 can identify the validity of the authentication information by identifying whether the signature value of the authentication information is the signature value of the second server 300. If the authentication information received from the first server 200 is valid, the third server 400 may transmit the authentication information and the biometric information issuance request information to the second server 300.

The second server 300 may transmit, to the third server 400, the second encrypted data and the first user identification information corresponding to the authentication information based on the authentication information and the biometric information issuance request information received from the first server 200.

The third server 400 may register the second encrypted data and the first user identification information received from the second server 300. Specifically, the third server 400 can match and register the second encrypted data and the first user identification information received from the second server 300.

Figure 6:
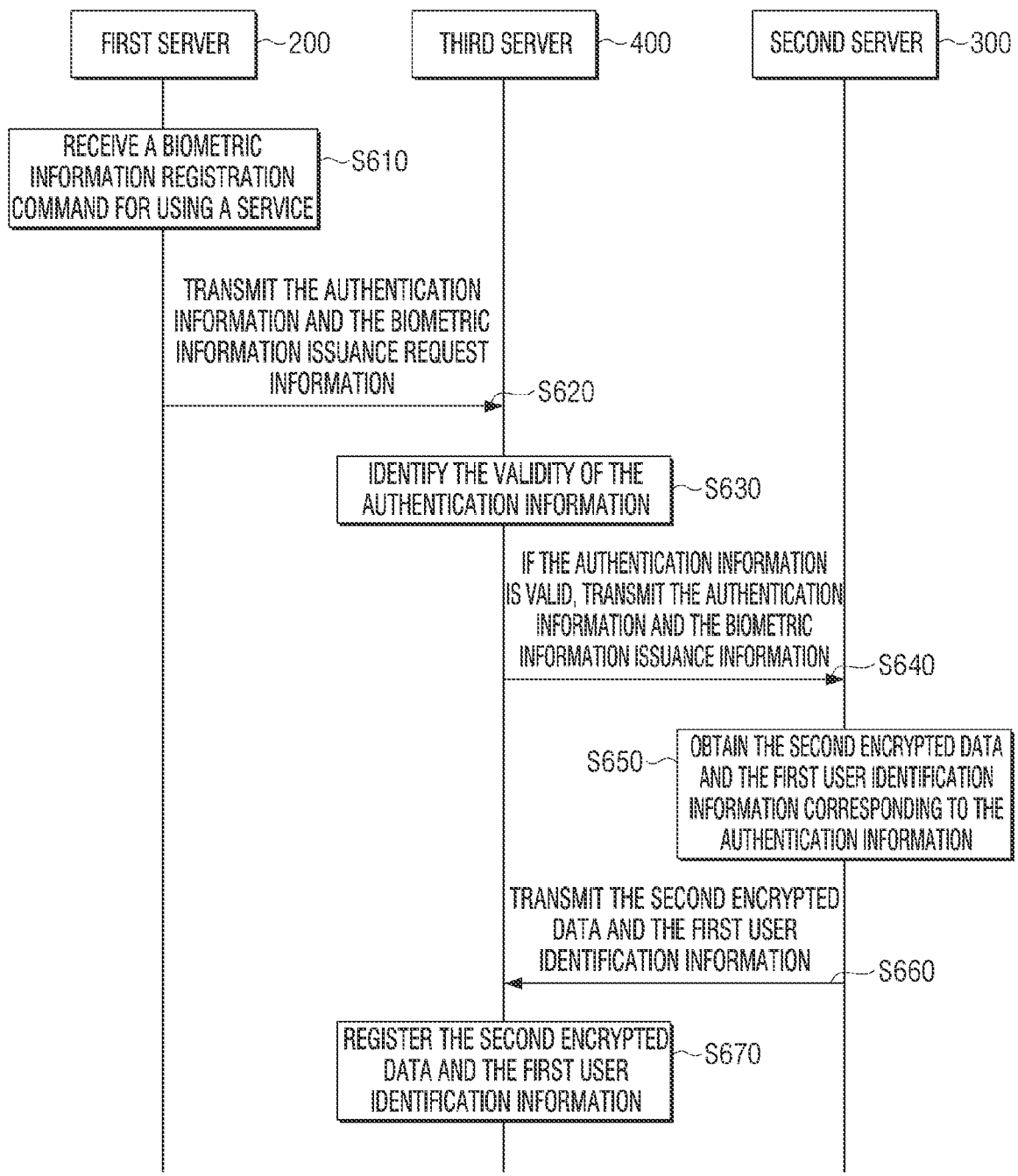
FIG. 6 is a sequence diagram illustrating a biometric information registration process according to various embodiments.

As illustrated in FIG. 6, in the biometric information registration process 600 for using a service, the first server 200, the second server 300, and the third server 400 may operation in association with each other.

First, the first server 200 may receive a biometric information registration command for using a service in operation S610. For example, the biometric registration command for using a service may be received from the third server 400 or a user terminal device.

The first server 200 may transmit, to the third server 400, the authentication information and the biometric information issuance request information corresponding to the biometric information registration command for using a service in operation S620.

The third server 400 can identify the validity of the authentication information received from the first server 200 in operation S630. Specifically, the third server 400 can identify the validity of the authentication information by identifying whether the signature value included in the authentication information is the signature value of the second server 300.

If the authentication information is valid, the third server 400 may transmit, to the second server 300, the authentication information and the biometric information issuance information in operation S640.

The second server 300 may obtain the second encrypted data and the first user identification information corresponding to the received authentication information in operation S650. The second server 300 may transmit the obtained second encrypted data and the first user identification information to the third server 400 in operation S660, and the third server 400 can register the second encrypted data obtained from the second server 300 and the first user identification information in operation S670. The third server 400 can match and store the second encrypted data and the first user identification information obtained from the second server 300.

In the user authentication process 700 for providing a service, when a command for inputting biometric information for performing a service is input, the electronic device 100 may obtain second biometric information, obtain third encrypted data in which the second biometric information is encrypted using the obtained second biometric information and the first encryption key, and transmit the same to the first server 200.

The first server 200 may obtain the fourth encrypted data in which the third encrypted data is encrypted using the third encrypted data and the second encryption key received from the electronic device 100 and may transmit the same to the third server 400.

The electronic device 100 can transmit the message authentication code along with the third encrypted data to the first server 200. The first server 200 may transmit the message authentication code received from the electronic device 100 to the third server 400 along with the fourth encrypted data, and the third server 400 can identify the validity of the fourth encrypted data based on the message authentication code received from the first server 200.

If the fourth encrypted data is valid, the third server 400 may identify whether the encrypted data corresponding to the fourth encrypted data received from the first server 200 is present in the third server 400.

In one embodiment, the third server 400 may compare the plurality of encrypted data stored in the third server 400 with the fourth encrypted data to identify whether there is encrypted data including biometric information corresponding to the second biometric information.

In another embodiment, when the first server 200 matches the fourth encrypted data and the second user identification information corresponding to the second biometric information and transmit the same to the third server 400, the third server 400 may obtain the same user identification information as the second user identification information from among the plurality of user identification information stored in the third server 400, compare the fourth encrypted data with the encrypted data matched with the same user identification information as the second user identification information, to identify whether the biometric information corresponding to the same user identification information as the second biometric information is the same as the second user identification information.

The third server 400 can identify whether encrypted data corresponding to the fourth encrypted data exists without decrypting the fourth encrypted data and a plurality of encrypted data stored in the third server 400. By identifying whether encrypted data corresponding to the fourth encrypted data exists, the third server 400 can perform the service without the information on the second biometric information.

If the encrypted data corresponding to the fourth encrypted data is present in the third server 400, the third server 400 may perform a service corresponding to the command for inputting the biometric information for performing the service.

Figure 7:
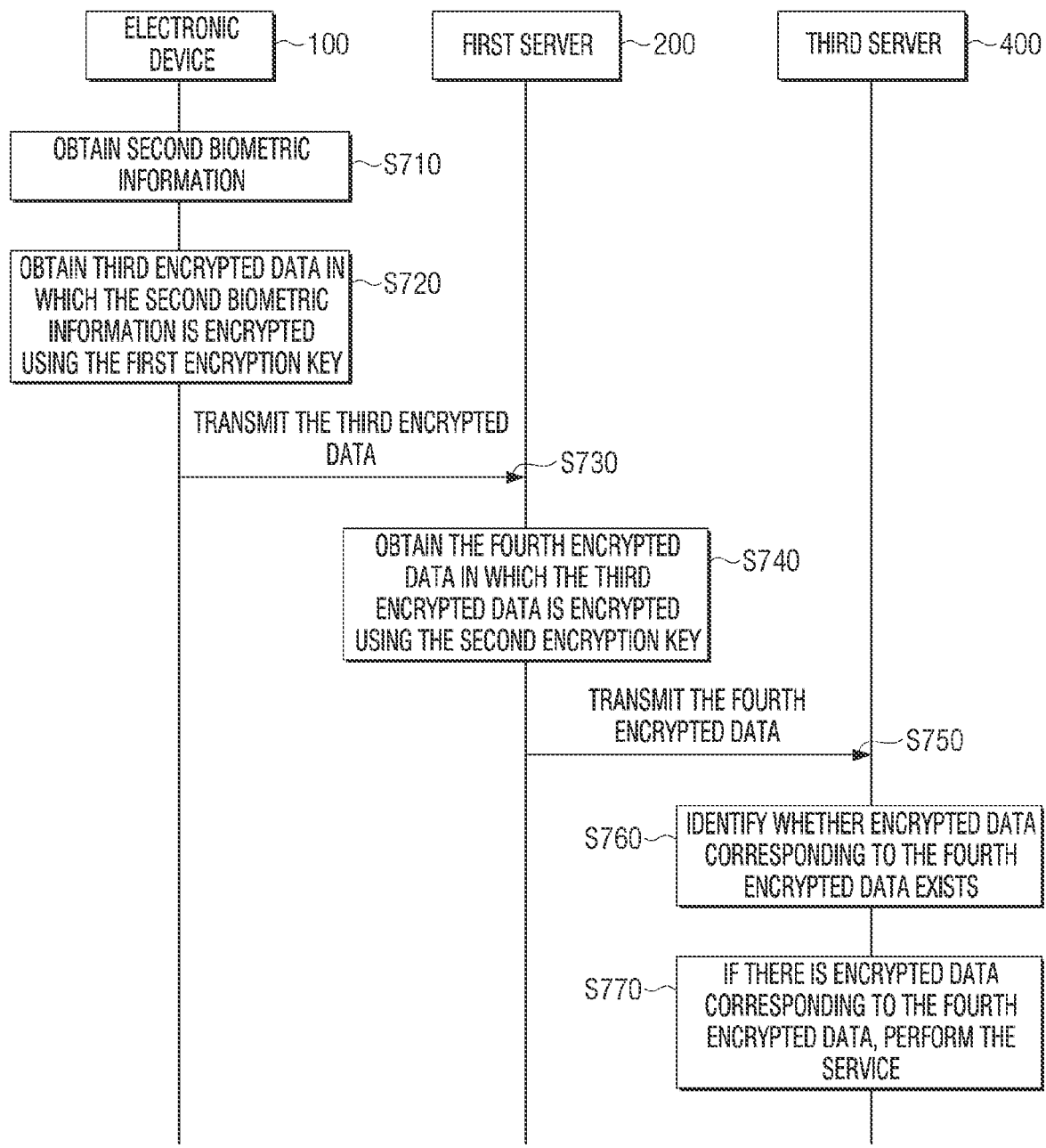
FIG. 7 is a sequence diagram illustrating a user authentication process for providing a service according to an embodiment.

As illustrated in FIG. 7, the user authentication process 700 for providing a service may operate in which the electronic device 100, the first server 200, and the third server 400 are in association with each other.

First, the electronic device 100 can obtain second biometric information in operation S710. Specifically, when the electronic device 100 receives a control signal for receiving the user's biometric information, the electronic device 100 may request the user to input the user's biometric information. For example, if the electronic device 100 includes a display, the electronic device 100 may display a guide screen that guides biometric information input. As another example, if the electronic device 100 includes a speaker, the electronic device 100 may output an audio signal requesting biometric input. The control signal for inputting biometric information can be received from a variety of devices. For example, a control signal for inputting biometric information may be received from the first server 200 or the second server. In this case, the control signal may further include information on the device to transmit the encrypted data in which the biometric information is encrypted. As another example, a biometric input signal may be generated within the electronic device 100. In this case, the electronic device 100 may receive information on the device to transmit the encrypted data in which the biometric information is encrypted.

The electronic device 100 can obtain third encrypted data in which the second biometric information is encrypted using the first encryption key in operation S720. At this time, the third encrypted data may be encrypted by a public key encryption method such as, for example, an ElGamal encryption scheme, a Diffie-Hellman encryption scheme, an elliptic curve encryption scheme, or the like.

The electronic device 100 may transmit the obtained third encrypted data to the first server 200 in operation S730.

The first server 200 can obtain the fourth encrypted data in which the third encrypted data is encrypted using the second encryption key in operation S740. At this time, the fourth encrypted data may be, for example, encrypted data by an inner product encryption method (IPE).

The first server 200 can obtain the second user identification information for the second biometric information together with the fourth encrypted data. At this time, the first server 200 can receive the second user identification information for the fourth encrypted data directly from the user, or can obtain the second user identification information based on the biometric information pre-registered in the external authentication authority and the user identification information matched with the previously registered biometric information.

The first server 200 may transmit the fourth encrypted data to the third server 400 in operation S750. When the fourth encrypted data and the second user identification information are obtained together, the first server 200 can transmit the fourth encrypted data and the second user identification information to the third server 400.

The third server 400 may identify whether encrypted data corresponding to the fourth encrypted data exists in operation S760. Specifically, the third server 400 may compare each of the plurality of encrypted data stored in the third server 400 with the fourth encrypted data to identify encrypted data of the same user as the user corresponding to the fourth encrypted data. At this time, the third server 400 may identify whether encrypted data corresponding to the fourth encrypted data exists without decrypting each of the plurality of stored encrypted data and the fourth encrypted data.

When the fourth encrypted data and the second user identification information are received together, the third server 400 can identify the same user identification information as the second user identification information. If the first biometric information and the second biometric information are the same user's biometric information, the same user identification information as the second user identification information will be the first user identification. In this case, the third server 400 can identify whether the fourth encrypted data and the second encrypted data are encrypted data for the same user. As described above, the third server 400 may identify whether the fourth encrypted data and the second encrypted data are encrypted data for the same user without decrypting the fourth encrypted data and the second encrypted data.

If there is encrypted data corresponding to the fourth encrypted data, the third server 400 can perform the service in operation S770. Specifically, the third server 400 may perform a service corresponding to the fourth encrypted data. In one embodiment, the service may be an offline payment service. If encrypted data corresponding to the fourth encrypted data exists, the third server 400 may perform a payment service for a product corresponding to the fourth encrypted data. In another embodiment, the service may be a vehicle rental service. If there is encrypted data corresponding to the fourth encrypted data, the third server 400 can provide the user with a service for transferring control authority for the vehicle corresponding to the fourth encrypted data.

Hereinbelow, operations of each of the electronic device 100, the first server 200, and the third server 400 will be described in greater detail with reference to FIGS. 3A to 3D.

FIGS. 3A to 3D are block diagrams briefly illustrating an electronic device, a first server, a second server, and a third server according to an embodiment.

Figure 3A:
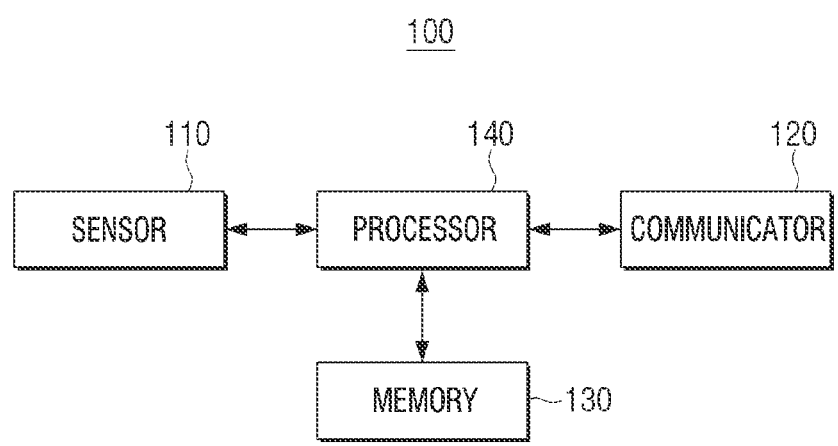
FIGS. 3A to 3D are block diagrams briefly illustrating an electronic device, a first server, a second server, and a third server according to an embodiment.

FIG. 3A is a block diagram briefly illustrating a configuration of the electronic device 100 according to an embodiment. As illustrated in FIG. 3A, the electronic device 100 includes the sensor 110, the communicator 120, the memory 130, and the processor 140.

The sensor 110 is configured to obtain various biometric information of a user. In order to obtain various biometric information of a user, the sensor 110 may include a variety of configurations. For example, the sensor 110 may be at least one of a fingerprint recognition sensor for recognizing a fingerprint of a user, an iris recognition sensor for recognizing an iris of the user, a camera for recognizing a face of the user, a microphone for recognizing the voice of the user, or the like.

The communicator 120 is configured to communicate with the first server 200 and the third server 400. In this case, the communicator 120 communicating with the first server 200 and the third server 400 may include communicating via a third device (e.g., a repeater, a hub, an access point, a server or a gateway, etc.).

The communicator 120 may include configurations to use various communication methods. For example, the communicator 120 may communicate with various external devices using wireless communication or wired communication. Wireless communication may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network. One of the various communication methods described above can be applied to a communicator 220 of the first server 200, a communicator 320 of the second server 300, and a communicator 420 of the third server 400.

As described above, the communicator 120 may transmit the encrypted data in which the biometric information is encrypted using the first encryption key to at least one of the first server 200 and the third server 400.

The memory 130 is configured to store a command or data related to at least one element of the electronic device 100. The memory 130 may include at least one of an embedded memory or a detachable memory. A memory embedded in the electronic device 100 may be a volatile memory, such as a dynamic random access memory (DRAM), a static random access memory (SRAM), a synchronous dynamic random access memory (SDRAM), or a nonvolatile memory, such as one-time programmable ROM (OTPROM), programmable ROM (PROM), erasable and programmable ROM (EPROM), electrically erasable and programmable ROM (EEPROM), mask ROM, flash ROM, a flash memory, a hard disk drive or a solid state drive (SSD). The external memory may include a flash drive, for example, a compact flash (CF), a secure digital (SD), micro-SD, mini-SD, extreme digital (xD), multi-media card (MMC), a memory stick, or the like. The external memory may be connected to the server 100 functionally or physically through various interface. The memory 210 of the first server 200, the memory 310 of the second server 300, and the memory 410 of the third server 400 may be applied with one of the various communication methods described above.

The memory 130 may store an encryption key for storing obtained biometric information or encrypting the biometric information.

The processor 140 is electrically connected to the memory 130 to control the overall operation and function of the electronic device 100. Specifically, the processor 140 may include one or more of a central processor, an application processor, or a communication processor (CP). The processor 140 may also be implemented as at least one of an application specific integrated circuit (ASIC), an embedded processor, a microprocessor, hardware control logic, a hardware finite state machine (FSM), a digital signal processor (DSP), or the like. Although not shown, the processor 140 may further include an interface, such as a bus for communicating with each of the configurations. The processor 140 may, for example, drive an operating system or application program to control a number of hardware or software components coupled to processor 140, and may perform various data processing and operations. The processor 140 may be implemented, for example, as a system on chip (SoC). According to one embodiment, the processor 140 may further include a graphics processing unit (GPU) and/or an image signal processor. The processor 140 may load and process commands or data received from at least one of the other components (e.g., non-volatile memory) into the volatile memory and store the result data in a non-volatile memory. The processor 232 of the first server 200, the processor 330 of the second server 300, and the processor 430 of the third server 400 are also applicable with one of the various communication methods described above.

The processor 140 may convert the information sensed by the sensor 110 into biometric information suitable for encryption. In the biometric information registration process 500, the processor 140 can transmit the first encrypted data, which is sensed by the sensor 110, to the first server 200 through the communicator 120. As described above, the first encrypted data may be encrypted by a public key encryption scheme such as, for example, an ElGamal encryption scheme, a Diffie-Hellman encryption scheme, an elliptic curve encryption scheme, or the like.

In the user authentication process 700 for providing the service, the processor 140 can transmit the second biometric information sensed by the sensor 110 to the first server 200 through the communicator 120. As described above, the third encrypted data may be encrypted by a public key encryption method, such as an ElGamal encryption scheme, a Diffie-Hellman encryption scheme, an elliptic curve encryption scheme, or the like.

In the user authentication process 700 for providing the service, the processor 140 can transmit the user authentication code to the first server 200 through the communicator 120, along with the third encrypted data. For example, the processor 140 may encrypt the second biometric information using the secret key of the electronic device 100 to obtain a message authentication code. Here, the secret key for obtaining the message authentication code may be a first encryption key, but is not limited thereto and may be a separate secret key. That is, the first server 200 does not have an encryption key capable of decrypting the message authentication code, and thus cannot decrypt the message authentication code. Accordingly, the processor 140 can prevent forgery or alteration of the third encrypted data at the first server 200 using the message authentication code.

Figure 3B:
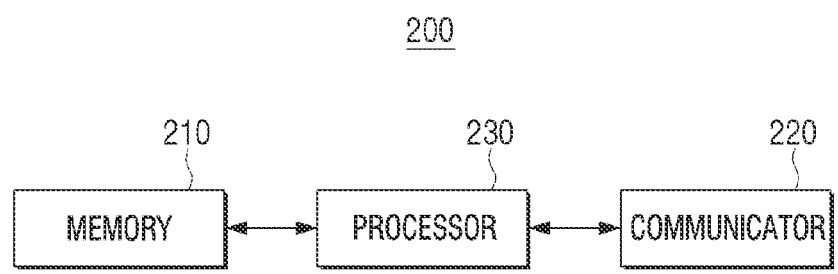

FIG. 3B is a block diagram briefly illustrating a configuration of the first server 200 according to an embodiment. As illustrated in FIG. 3B, the first server 200 includes the memory 210, the communicator 220, and the processor 230.

The memory 210 is configured to store instructions or data related to at least one other component of the first server 200. In addition, the memory 210 may store the first encrypted data or the third encrypted data received from the electronic device 100. The memory 210 may also store authenticated encrypted data and user identification information from the second server 200.

The communicator 220 is configured to communicate with the electronic device 100, the second server 300, and the third server 400. As described above, the communicator 220 may receive the first encrypted data or the third encrypted data from the electronic device 100, transmit the second encrypted data and the first user identification information to the second server 200, transmit the fourth encrypted data to the third server 400, or transmit the message authentication code received from the electronic device 100 to the third server 400 if necessary.

The processor 230 is electrically connected to the memory 210 for controlling overall operations and functions of the first server 200.

Specifically, in the biometric information registration process 500, the processor 230 may encrypt the first encrypted data received from the electronic device 100 to the second encrypted data using the second encryption key. Here, the second encrypted data may be encrypted data by, for example, an inner product encryption method (IPE). Using the encryption of IPE, there is an effect that the third server 400 may check whether the first biometric information corresponding to the second encrypted data and the second biometric information corresponding to the fourth encrypted data are the same user's biometric information without decrypting the second encrypted data and the fourth encrypted data. The processor 230 may also receive first user identification information for the first encrypted data. The processor 230 can match and store the second encrypted data and the first user identification information, and transmit the matched second encrypted data and the first user identification information to the second server 300. The processor 230 may receive authentication information for the second encrypted data and the first user identification information from the second server 300. The received authentication information may be used in the biometric information registration process 600 for using a service.

In the biometric information registration process 600 for using a service, if a user command for registration of biometric information for using a service is input, the processor 230 can transmit the received authentication information to the third server 400. At this time, the processor 230 may transmit, to the third server 400, biometric information issuance request information requesting to register the biometric information corresponding to the authentication information to the third server 400 together with the authentication information.

In the user authentication process 700 for providing a service, the processor 230 may encrypt the third encrypted data received from the electronic device 100 to the fourth encrypted data using the second encryption key. At this time, as described above, the fourth encrypted data may be encrypted data by inner product encryption (IPE). Through the encryption process using the second encryption key described above, there is an effect that even if data is hacked by an external attack, the encrypted data of the third server 400 may be merely exposed, and the biometric information of the user can be protected.

The processor 230 may transmit the acquired fourth encrypted data to the third server 400. At this time, if necessary, the processor 230 can transmit the fourth encrypted data and the second user identification information corresponding to the fourth encrypted data to the third server 400. Further, upon receiving the message authentication code from the electronic device 100, the processor 230 can transmit the fourth encrypted data, the second user identification information corresponding to the fourth encrypted data, and the message authentication code received from the electronic device 100 to the third server 400. When the message authentication code is transmitted to the third server 400, the processor 230 may encrypt the received message authentication code and transmit the encrypted message authentication code to the third server. By using the message authentication code, the system 1000 can prevent the situation in which the encrypted data is forged or modulated maliciously by the first server 200. Specifically, when the first server 200 transmits the encrypted data other than the third encrypted data received from the electronic device 100 to the third server 400, the third server 400 can identify that the encrypted data for the message authentication code and the encrypted data received from the first server 200 are different data.

By the first server 200 encrypting the first encrypted data and the third encrypted data using the second encryption key, even if one of the electronic device 100 or the third server 400 is hacked, there is an effect that the biometric information of a user may be protected.

Figure 3C:
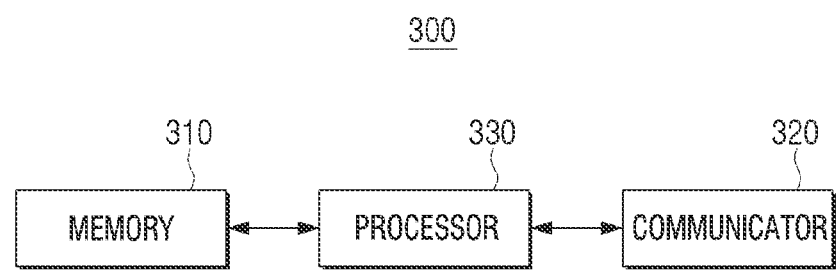

FIG. 3C is a block diagram briefly illustrating a configuration of the second server 300 according to an embodiment. As illustrated in FIG. 3C, the second server 300 includes a memory 310, a communicator 320, and a processor 330.

The memory 310 is configured to store instructions or data related to at least one other component of the second server 300. The memory 310 can match and store the second encrypted data and the first user identification information received from the first server 200.

The communicator 320 is configured to communicate with the first server 200 and the third server 400. As described above, the communicator 320 may receive the second encrypted data and the first user identification information from the first server 200, or may transmit the second encrypted data and the first user identification information to the third server 400.

The processor is electrically connected to the memory 310 for controlling overall operations and functions of the second server 300.

Specifically, in the biometric information registration process 500, the processor 330 may obtain the second encrypted data and the first user identification information from the first server 200. At this time, the processor 330 can identify whether the first user identification information is user identification information corresponding to the second encrypted data. The method of identifying whether the first user identification information is user identification information corresponding to the second encrypted data may vary. For example, the processor 330 may transmit a request, to the user terminal device corresponding to the first user identification information, for confirming whether the first user identification information is user identification information corresponding to the second encrypted data. Upon receiving a message from the user terminal device that the first user identification information corresponds to the second encrypted data, the processor 330 may identify that the first user identification information is user identification information corresponding to the second encrypted data. However, the embodiment it is not limited to the above-described embodiment, and whether the second encrypted data corresponds to the first user identification information may be identified in a face-to-face manner, for example.

If the second encrypted data is identified to be encrypted data corresponding to the first user identification information, the processor 330 may obtain authentication information for the second encrypted data and the first user identification information. At this time, the authentication information may include the signature value of the second server 300 and the index information for authenticating the second encrypted data and the first user identification information. Specifically, the authentication information may include a signature value of the second server 300 and index information for authenticating the second encrypted data and the first user identification information, without including the second encrypted data and the first user identification information. However, the embodiment is not limited thereto. That is, according to various embodiments, the authentication information may include the second encrypted data and the first user identification information. If the authentication information includes the second encrypted data and the first user identification information, the processor 330 may encrypt the second encrypted data and the first user identification information to obtain authentication information. Meanwhile, as described below, the signature value of the second server 300 can be information for confirming whether the authentication information received by the third server 400 is received from the second server 300 without forgery or modulation. The processor 330 may transmit the obtained authentication information to the first server 200.

In the biometric information registration process 600 for using a service, the processor 330 can receive authentication information from the third server 400 and obtain encrypted data and user identification information corresponding to the received authentication information. If there is no forgery or modulation due to an external attack, the processor 330 can obtain the second encrypted data and the first user identification information with the encrypted data and the user identification information corresponding to the authentication information. In one embodiment, if the authentication information includes only index information for encrypted data and user identification information, the processor 330 may obtain the second encrypted data and the first user identification information from the index information for the encrypted data and the user identification information. In another embodiment, if the authentication information is data in which the encrypted data and the user identification information are encrypted, the processor 330 may decrypt the authentication information to obtain the second encrypted data and the first user identification information.

Figure 3D:
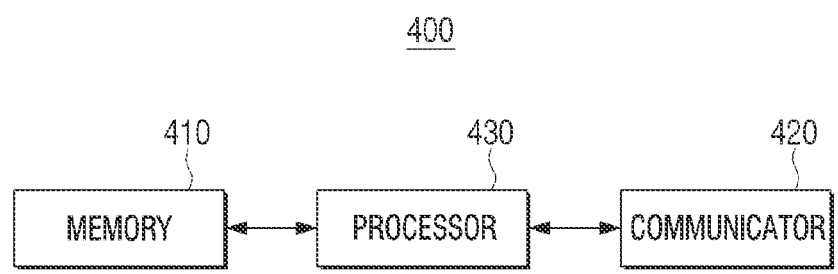

FIG. 3D is a block diagram briefly illustrating a configuration of the third server 400 according to an embodiment. As illustrated in FIG. 3D, the third server 400 includes the memory 410, the communicator 420, and the processor 430.

The memory 410 is configured to store instructions or data related to at least one other component of the third server 400. The memory 410 may store authentication information and biometric information issuance request information received from the first server 200. The memory 410 may store the second encrypted data and the first user identification information received from the second server 300. In addition, the memory 410 may store at least one of the third encrypted data and the second user identification information received from the first server 200.

The communicator 420 is configured to communicate with the first server 200 and the second server 300. As described above, the communicator 220 may receive authentication information and biometric information issuance request information from the first server 200, receive the second encrypted data and the first user identification information from the second server 300, or receive at least one of the third encrypted data and the second user identification information from the first server 200.

The processor 430 is electrically connected with the memory 410 for controlling overall operations and functions of the third server 400.

In the biometric information registration process 600 for using a service, when a user command for registering biometric information for using a service is input, the processor 430 can receive authentication information and biometric information issuance request information from the first server 200.

The processor 430 may identify whether the received authentication information is valid. Specifically, the processor 430 can identify the validity of the authentication information by identifying whether the signature value included in the authentication information is a signature value of the second server 300. If the signature value included in the authentication information is generated at the second server 300, the processor 430 can identify that the authentication information is valid. If the signature value included in the information is not generated at the second server 300, the processor 430 may identify that the authentication information is not valid.

If the authentication information is valid, the processor 430 may transmit, to the second server 300, the authentication information and the biometric information issuance request information received from the first server 200. The processor 430 may receive the second encrypted data and the first user identification information corresponding to the authentication information from the second server and store the received second encrypted data and the first user identification information in the memory 410. Through the above-described process, the third server 400 can obtain only the second encrypted data without receiving the first biometric information and the first encrypted data, and may improve security.

In the user authentication process 700 for providing a service, the processor 430 can receive the fourth encrypted data from the first server 200 when a command for performing the service is input. The processor 430 may identify whether the encrypted data corresponding to the fourth encrypted data is present in the memory 410.

In one embodiment, the processor 430 may compare each of the plurality of encrypted data stored in the memory 410 with the fourth encrypted data to identify whether the encrypted data corresponding to the fourth encrypted data is stored in the memory 410.

In another embodiment, the processor 430 may receive the fourth encrypted data and the second user identification information corresponding to the fourth encrypted data from the first server 200. The processor 430 may obtain the same user identification information as the second user identification information. If the first biometric information and the second biometric information are the same user's biometric information, the second user identification information will be the same as the first user identification information. The processor 430 may identify whether the fourth encrypted data corresponding to the second user identification information and the second encrypted data corresponding to the first user identification information (identical to the second user identification information) are encrypted data for the same user's biometric information.

The processor 430 can compare the fourth encrypted data with the plurality of encrypted data stored in the memory 410 without decrypting. For example, the processor 430 may compare the fourth encrypted data and the second encrypted data stored in the memory 410 without decrypting. The second encrypted data and the fourth encrypted data have a homomorphic nature capable of operation in a state in which data is encrypted, as described above, and the first encryption key used to obtain the first encrypted data and the third encrypted data may be considered a plaintext in the encryption method using the second encryption key. Accordingly, the processor 430 can compare the first biometric information corresponding to the second encrypted data with the second biometric information corresponding to the fourth encrypted data without decrypting, using the feature of the first encryption method and the feature of the second encryption method described above.

When the encrypted data corresponding to the fourth encrypted data is present in the memory 410, the processor 430 may perform a service.

Figure 4:
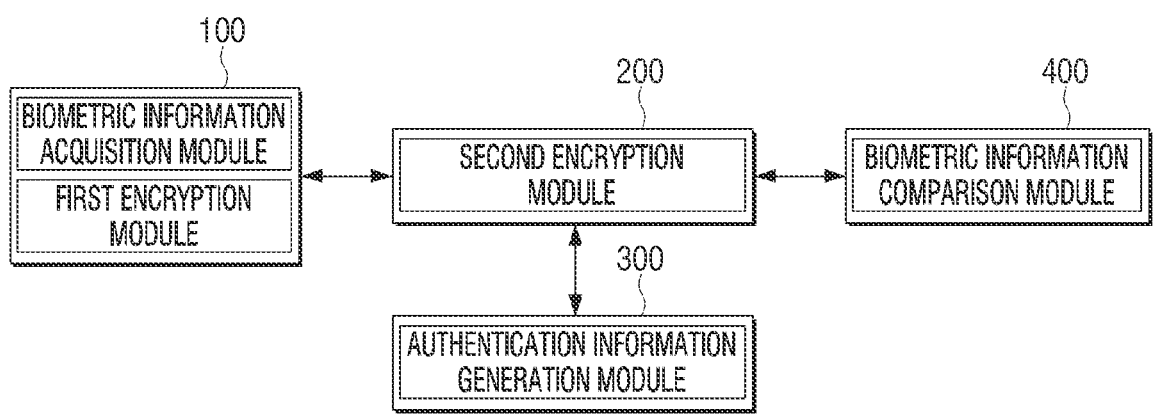
FIG. 4 is an example diagram illustrating various modules included in the electronic device, the first server, the second server, and the third server according to an embodiment.

The various functions performed by the electronic device 100, the first server 200, the second server 300, and the third server 400 may be performed through various modules. For example, as shown in FIG. 4, the electronic device 100 may obtain the biometric information of the user through the biometric information acquisition module and obtain the first encrypted data in which the biometric information is encrypted through the first encryption module. The first server 200 may encrypt the first encrypted data to the second encrypted data through the second encryption module. The second server 300 can generate authentication information for the second encrypted data and the first user identification information through the authentication information generation module. The third server 400 can obtain the encrypted data including the same biometric information as the second biometric information corresponding to the fourth encrypted data through the biometric information comparison module.

The various modules shown in FIG. 4 may be implemented in software modules or in the form of at least one hardware chip. When the various modules shown in FIG. 4 are implemented as software modules (or program modules including instructions), the software modules can be stored in a computer readable non-transitory computer readable medium. In this case, the software module can be provided by an operating system (OS) or provided by a given application. Alternatively, some of the software modules may be provided by the OS, and some of the remaining software modules may be provided by a predetermined application.

Figure 8A:
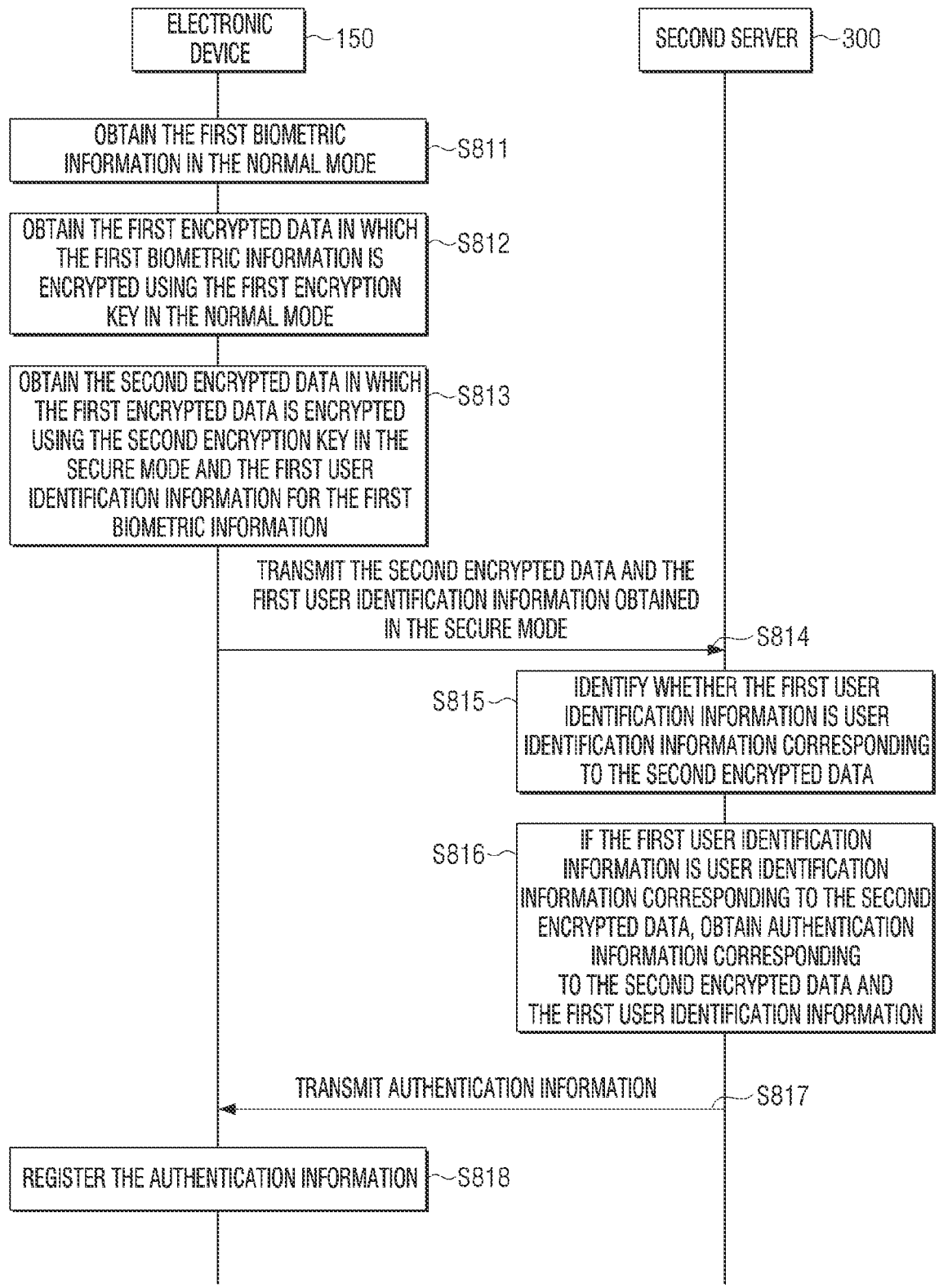
FIGS. 8A and 8B are sequence diagrams illustrating a biometric information registration process, a biometric information registration process for using a service, and a user authentication process for providing a service according to various embodiments.
Figure 8B:
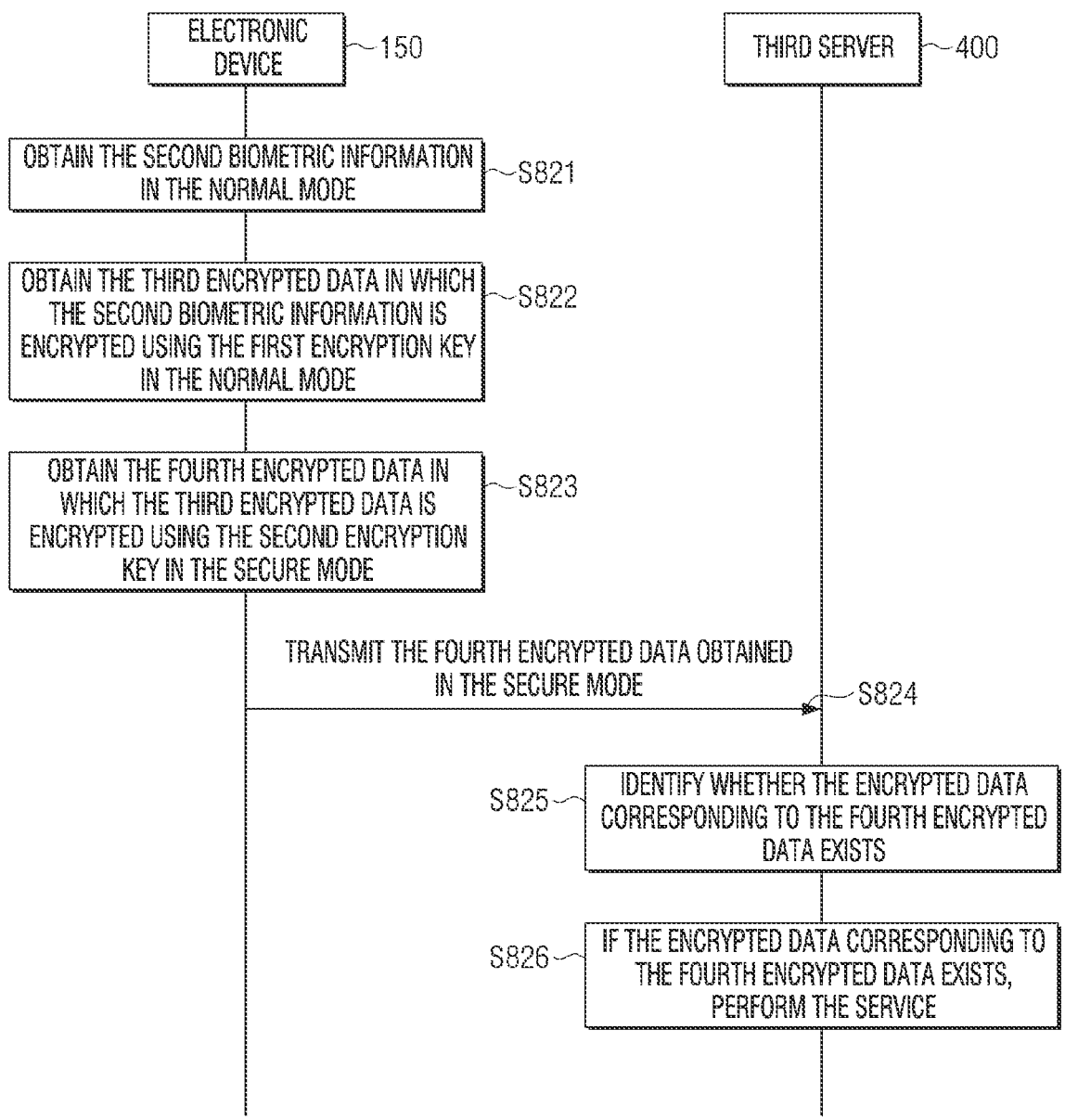

FIGS. 8A and 8B are sequence diagrams illustrating a biometric information registration process, a biometric information registration process for using a service, and a user authentication process for providing a service according to various embodiments.

Specifically, according to various embodiments, at least two of the electronic device 100, the first server 200, the second server 300, and the third server 400 may be implemented as one device. For example, referring to FIGS. 8A and 8B, the electronic device 100 and the first server 200 may be implemented with one electronic device 150. In this case, the electronic device 150 may be implemented, for example, as a user terminal device. The electronic device 150 may be an electronic device operating in a normal mode and a secure mode. Specifically, the secure mode may refer to a data processing architecture that secures security, and the normal mode may refer to a general data processing architecture. The normal mode may operate in a normal operating system (OS), or a secure mode may operate in the secure OS, and the normal mode and secure mode may operate independently of each other. Therefore, even if an external attack occurs due to hacking in the normal mode, the data in the secure mode can be protected.

FIG. 8A is a sequence diagram illustrating an operation of the system 1000 in the biometric information registration process 500.

First, the electronic device 150 can obtain the first biometric information in the normal mode in operation S811. The electronic device 150 may obtain the first encrypted data in which the first biometric information is encrypted using the first encryption key in the normal mode in operation S812.

The electronic device 150 can obtain the second encrypted data in which the first encrypted data is encrypted using the second encryption key in the secure mode and the first user identification information for the first biometric information in operation S813. The electronic device 150 may transmit the second encrypted data and the first user identification information obtained in the secure mode to the second server 300 in operation S814.

The second server 300 may identify whether the first user identification information received from the electronic device 150 is user identification information corresponding to the second encrypted data in operation S815, and if the first user identification information is user identification information corresponding to the second encrypted data, may obtain authentication information corresponding to the second encrypted data and the first user identification information in operation S816. The second server 300 can transmit the obtained authentication information to the electronic device 150 (S817). That is, the operation of the second server 300 is the same as that described in FIG. 5.

The electronic device 150 may register the authentication information received from the first server 200 in operation S818. Specifically, the electronic device 150 may register the authentication information received from the first server 200 in the secure mode.

FIG. 8B is a sequence diagram illustrating an operation of the system 1000 in the user authentication process 700.

The electronic device 150 may obtain the second biometric information in the normal mode in operation S821. The electronic device 150 may obtain the third encrypted data in which the second biometric information is encrypted using the first encryption key in the normal mode in operation S822.

The electronic device 150 can obtain the fourth encrypted data in which the third encrypted data is encrypted using the second encryption key in the secure mode in operation S823. Further, the electronic device 150 can obtain the second user identification information for the second biometric information together with the fourth encrypted data.

The electronic device 150 may transmit the fourth encrypted data obtained in the secure mode to the third server 400 in operation S824. Further, the electronic device 150 can transmit the second user identification information for the second biometric information along with the fourth encrypted data.

The third server 400 may identify whether the encrypted data corresponding to the acquired fourth encrypted data exists in operation S825, and if the encrypted data corresponding to the fourth encrypted data exists, the third server 400 can perform the service in operation S826. That is, the operation of the third server 400 is the same as that described in FIG. 7.

FIGS. 8A and 8B have described an embodiment in which the electronic device 100 and the first server 200 are implemented as a single device, but the embodiment is not limited thereto. For example, if necessary, the first server 200 and the third server 400 may be implemented as a single device, or the electronic device 100 and the third server 400 may be implemented as a single device, or the electronic device 100 and the second server 300 may be implemented as a single device.

Figure 9:
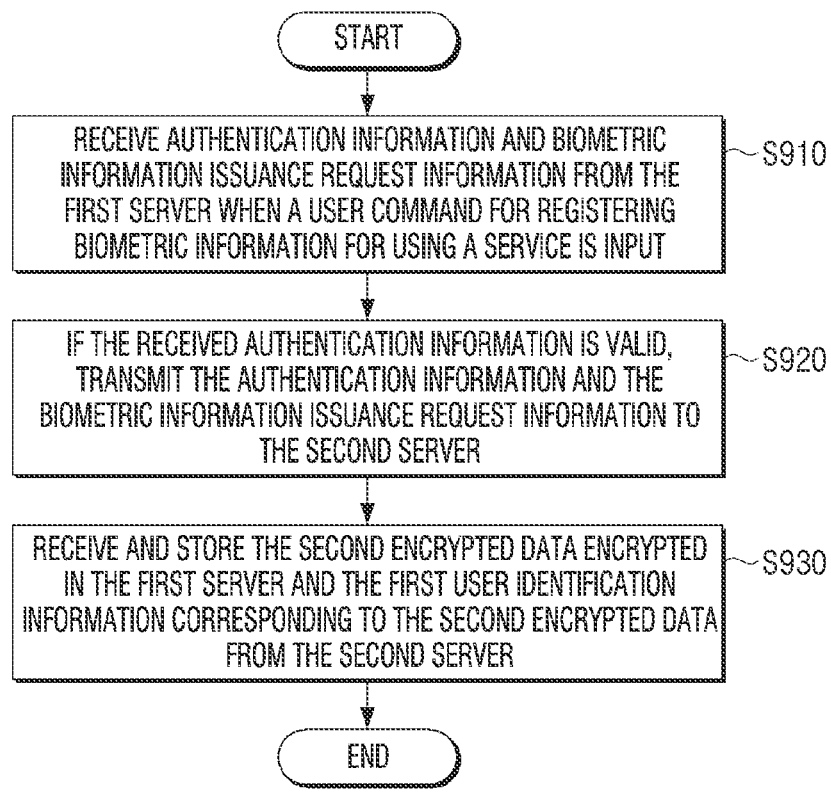
FIG. 9 is a flowchart illustrating a method for controlling a third server according to an embodiment.

FIG. 9 is a flowchart illustrating a method for controlling a third server according to an embodiment.

First, the third server 400 may receive authentication information and biometric information issuance request information from the first server 200 when a user command for registering biometric information for using a service is input in operation S910.

If the received authentication information is valid, the third server 400 may transmit the authentication information and the biometric information issuance request information to the second server 300 in operation S920. As described above, the third server 400 can identify the validity of the authentication information by identifying whether the signature value of the authentication information is the signature value of the second server 300.

The third server 400 may receive and store the second encrypted data and the first user identification information corresponding to the second encrypted data from the second server 300 in operation S930. As described above, the third server 400 may store the second encrypted data and the first user identification information, and if the encrypted data corresponding to the stored data is input, the third server 400 can perform the service.

The term "unit" or "module" as used herein includes units configured in hardware, software, or firmware, and may be used interchangeably with terms such as, for example, logic, logic blocks, components, or circuits. A "unit" or "module" can be an integral part or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including an electronic device (e.g., the electronic device 100). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

According to one or more embodiments, a method disclosed herein may be provided in a computer program product. A computer program product may be traded between a seller and a purchaser as a commodity. A computer program product may be distributed in the form of a machine-readable storage medium (e.g., CD-ROM) or distributed online through an application store (e.g., Playstore™). In the case of online distribution, at least a portion of the computer program product may be stored temporarily or at least temporarily in a storage medium such as a manufacturer's server, a server in an application store, or a memory in a relay server.

Each of the components (for example, a module or a program) according to one or more embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with embodiments, may be performed sequentially, in a parallel, repetitive, or heuristic manner, or at least some operations may be performed in a different order, omitted, or other operations can be added.

What is claimed is:

1. A method for controlling a system including an electronic device, a first server, and a second server, the method comprising:
    obtaining, by the electronic device, first biometric information;
    obtaining, by the electronic device, first encrypted data, in which the first biometric information is encrypted, by using the obtained first biometric information and a first encryption key, and transmitting the obtained first encrypted data to the first server;
    obtaining, by the first server, second encrypted data, in which the first encrypted data is encrypted, by using the first encrypted data received from the electronic device and a second encryption key, and first user identification information corresponding to the first biometric information, and transmitting same to the second server;
    matching, by the second server, the second encrypted data received from the first server and first user identification information corresponding to the first biometric information and storing same based on transmitting a request for confirming whether the first user identification information corresponds to the second encrypted data to a user terminal device corresponding to the first user identification information;
    obtaining, by the second server, authentication information based on the matched second encrypted data and the first user identification information and transmitting same to the first server; and
    registering, by the first server, the authentication information about the first biometric information to indicate that second encrypted data and the first user identification are authenticated for a service.

2. The method of claim 1, wherein the system further comprises a third server providing a service, and the method comprising:
    based on receiving, by the first server, a biometric information registration command for using a service of the third server, transmitting, by the first server, the authentication information and biometric information issuance request information to the third server;
    checking, by the third server, validity of the received authentication information;
    based on the received authentication information being valid, transmitting, by the third server, the authentication information and the biometric information issuance request information to the second server;
    transmitting, by the second server, the second encrypted data corresponding to the authentication information and the first user identification information to the third server; and
    registering, by the third server, the second encrypted data received from the second server and the first user identification information.

3. The method of claim 2, comprising:
    obtaining, by the electronic device, second biometric information;
    based on a command for inputting biometric information for performing a service being input, obtaining, by the electronic device, third encrypted data, in which the first biometric information is encrypted, by using the obtained second biometric information and a first encryption key, and transmitting same to the first server;
    obtaining, by the first server, fourth encrypted data, in which the third encrypted data is encrypted, by using the third encrypted data received from the electronic device and a second encryption key and transmitting same to the third server;
    identifying, by the third server, whether encrypted data corresponding to the received fourth encrypted data is present in the third server; and
    based on the encrypted data corresponding to the fourth encrypted data being present in the third server, performing, by the third server, a service corresponding to a command for inputting biometric information to perform the service.

4. The method of claim 3, wherein the identifying whether the encrypted data corresponding to the fourth encrypted data is present in the third server comprises:
    comparing, by the third server, a plurality of encrypted data stored in the third server with the received fourth encrypted data and identifying whether encrypted data including biometric information corresponding to the second biometric information is present.

5. The method of claim 3, wherein the obtaining, by the first server, the fourth encrypted data and transmitting same to the third server comprises:
   matching the fourth encrypted data and second user identification information corresponding to the second biometric information and transmitting same to the third server.

6. The method of claim 5, wherein the identifying whether encrypted data corresponding to the fourth encrypted data is present in the third server comprises:
   obtaining, by the third server, identification information that is same as the second user identification information among a plurality of user identification information stored in the third server; and
   by comparing the fourth encrypted data and the encrypted data matched with the user identification information that is the same as the second user identification information, identifying whether the second biometric information is the same as the biometric information corresponding to the user identification information that is the same as the second user identification information.

7. The method of claim 3, wherein:
   the obtaining the third encrypted data and transmitting same to the first server comprises transmitting, to the first server, a message authentication code along with the third encrypted data,
   the obtaining the fourth encrypted data and transmitting same to the third server comprises transmitting, to the third server, the message authentication code received from the electronic device along with the fourth encrypted data,
   wherein the controlling method comprises identifying, by the third server, validity of the fourth encrypted data based on the message authentication code received from the first server.

8. The method of claim 3, wherein the identifying whether the encrypted data is present in the third server comprises identifying encrypted data corresponding to the fourth encrypted data without decrypting the fourth encrypted data and a plurality of encrypted data stored in the third server.

9. The method of claim 1, wherein the first user identification information is obtained by the first server.

10. The method of claim 2, wherein:
   the obtaining, by the second server, authentication information and transmitting same to the first server comprises obtaining the authentication information corresponding to the matched second encrypted data and the first user identification information based on a signature value of the second server, and
   checking, by the third server, validity of the received authentication information comprises identifying validity of the authentication information based on the signature value.

11. A system comprising:
   an electronic device comprising a hardware processor, the hardware processor configured to obtain, via a communicator, first biometric information and first encrypted data, in which the first biometric information is encrypted, by using the obtained first biometric information and a first encryption key;
   a first server configured to receive the first encrypted data from the electronic device and obtain second encrypted data, in which the first encrypted data is encrypted, by using the first encrypted data and a second encryption key and first user identification information corresponding to the first biometric information; and
   a second server configured to receive the second encrypted data from the first server, obtain authentication information based on the second encrypted data, and transmit the authentication information to the first server,
   wherein the second server is further configured to:
   match the second encrypted data received from the first server and first user identification information corresponding to the first biometric information and store same based on transmitting a request for confirming whether the first user identification information corresponds to the second encrypted data to a user terminal device corresponding to the first user identification information; and
   obtain authentication information based on the matched second encrypted data and the first user identification information and transmitting same to the first server, and wherein the first server is further configured to register the authentication information received from the second server as the authentication information with respect to the first biometric information to indicate that second encrypted data and the first user identification are authenticated for a service.

12. The system of claim 11, wherein:
   the system further comprises a third server providing a service,
   the first server is configured to receive a biometric information registration command for using a service of the third server and transmit the authentication information and biometric information issuance request information to the third server,
   the third server is configured to check validity of the received authentication information, and based on the received authentication information being valid, transmit the authentication information and the biometric information issuance request information to the second server,
   the second server is configured to transmit the second encrypted data corresponding to the authentication information received from the third server and the first user identification information to the third server, and
   the third server is configured to register the second encrypted data received from the second server and the first user identification information.

13. The system of claim 12, wherein:
   the electronic device is configured to obtain, by the electronic device, second biometric information, based on a command for inputting biometric information for performing a service being input, obtain third encrypted data, in which the first biometric information is encrypted, by using the obtained second biometric information and a first encryption key, and transmit same to the first server,
   the first server is configured to obtain fourth encrypted data, in which the third encrypted data is encrypted, by using the third encrypted data received from the electronic device and a second encryption key and transmit same to the third server,
   the third server is configured to identify whether encrypted data corresponding to the received fourth encrypted data is present in the third server, and based on the encrypted data corresponding to the fourth encrypted data being present in the third server, perform a service corresponding to a command for inputting biometric information to perform the service.

14. The system of claim 13, wherein the third server is configured to compare a plurality of encrypted data stored in the third server with the received fourth encrypted data and identify whether encrypted data including biometric information corresponding to the second biometric information is present.

* * * * *